United States Patent [19]

Meyer

[11] 4,223,453

[45] Sep. 23, 1980

[54] TRAINING AID FOR REGISTERING MULTI-COLOR PRINTING

[75] Inventor: John H. Meyer, Madison, Conn.

[73] Assignee: R. R. Donnelley & Sons Company, Chicago, Ill.

[21] Appl. No.: 31,322

[22] Filed: Apr. 19, 1979

[51] Int. Cl.³ .............................................. G09B 19/24
[52] U.S. Cl. ................................ 35/13; 101/DIG. 12
[58] Field of Search ............. 35/13, 28; 101/DIG. 12, 101/136, 193, 211

[56] References Cited

U.S. PATENT DOCUMENTS

| | | | |
|---|---|---|---|
| 2,921,378 | 1/1960 | Mueller | 101/DIG. 12 |
| 2,961,770 | 11/1960 | Imshaug | 101/DIG. 12 |
| 3,264,106 | 8/1966 | Allan | 101/DIG. 12 |
| 3,613,252 | 2/1969 | Moon | 101/DIG. 12 |
| 3,841,217 | 10/1974 | Hodges | 101/DIG. 12 |
| 3,969,826 | 7/1976 | Ottenhue | 101/211 |
| 4,018,528 | 4/1977 | Dennis | 101/DIG. 12 |

Primary Examiner—Theodore A. Granger
Attorney, Agent, or Firm—Wegner, Stellman, McCord, Wiles & Wood

[57] ABSTRACT

A training aid of the simulator type for use in teaching the techniques of adjusting the cylinders of a multi-color rotary web printing press to achieve acceptable registration between the successive impressions forming a printed color page. Four superimposed positive colored film transparencies mounted on a light box provide facsimiles of the red, yellow, blue and black images successively printed on a web; and all but the black transparency are carried separately on adjustable frames which are movable to effectively simulate the endwise (button-to-gear), the circumferential and the cocking adjustments of the plate cylinders of a rotary press. Endwise and circumferential simulating movements are by electric motors each of which is controlled for forward and reverse drive by a manual switch that is identical with the switch on a press cylinder adjustment control panel, and the manual cocking control precisely simulates that for a press cylinder. A "timer" which operates during a registration training run shows both elapsed time to achieve registration and the number of imperfect impressions produced in that time by a press operating at 500 feet per minute.

28 Claims, 7 Drawing Figures

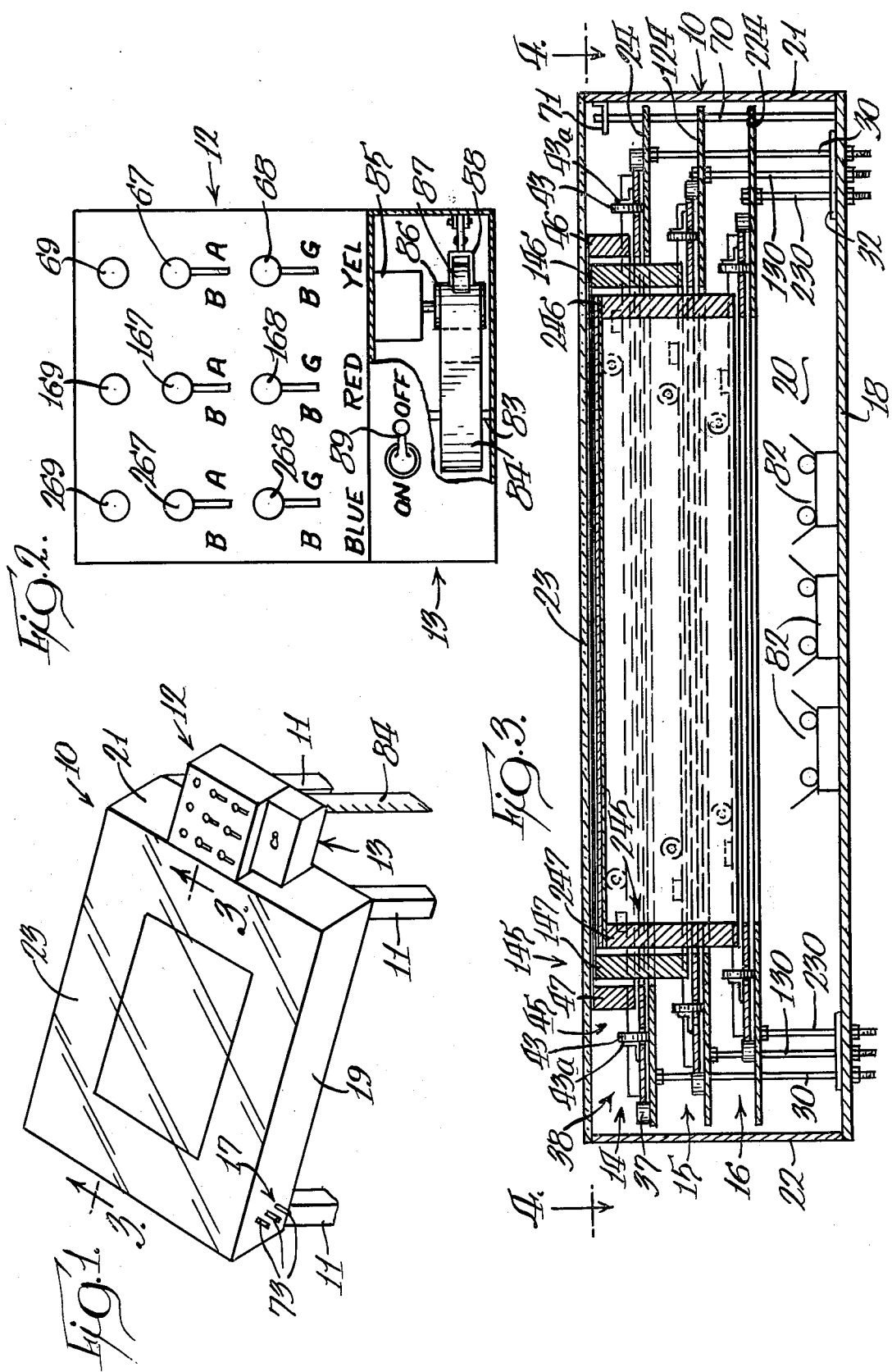

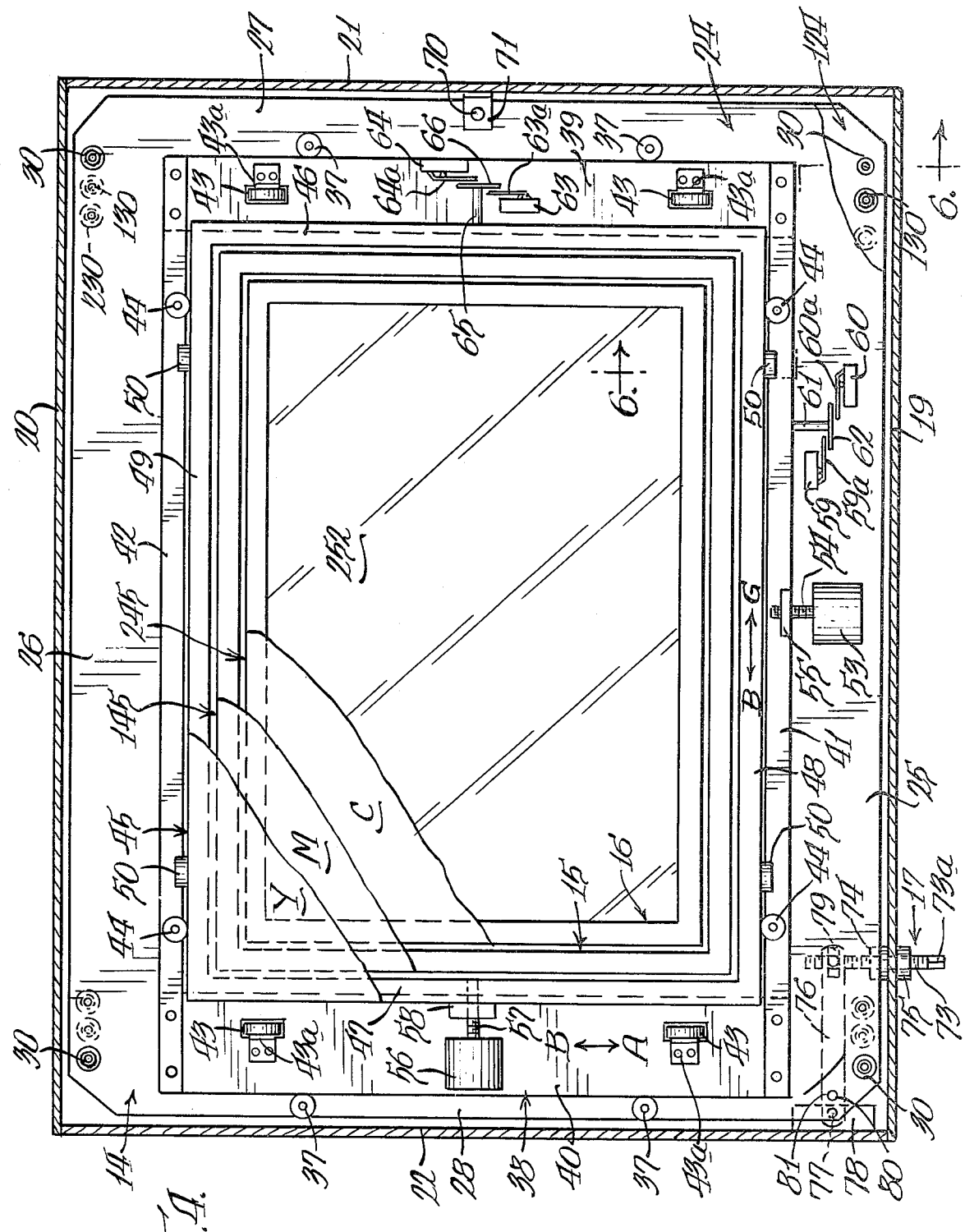

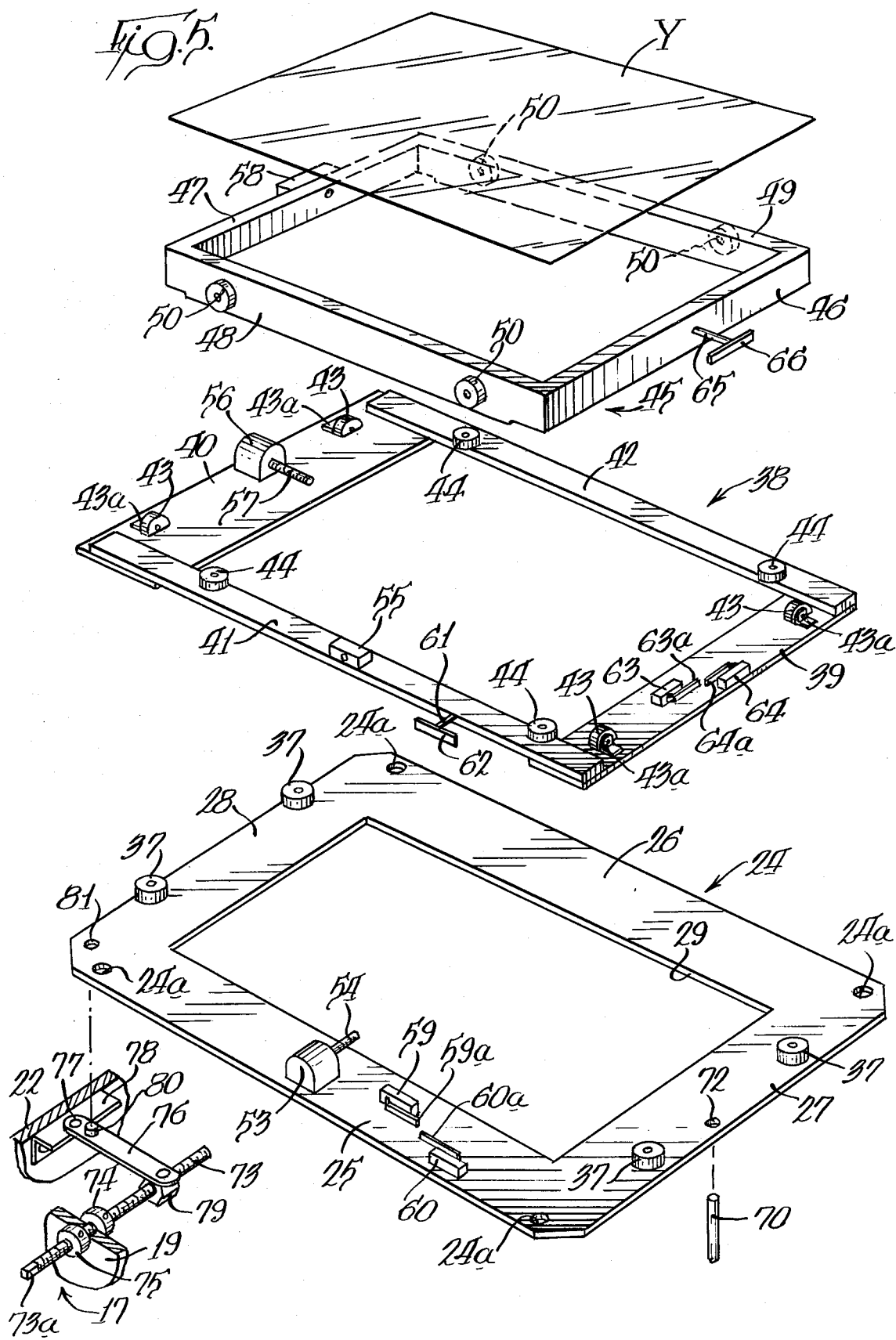

TRAINING AID FOR REGISTERING MULTI-COLOR PRINTING

BACKGROUND OF THE INVENTION

Multi-color printing on web presses, whether carried out by means of the letterpress, offset or gravure methods, requires very precise registration of the impressions formed upon the paper web by the several cylinders which provide the different colors for the finished, printed web. The problem of obtaining exact registration is, of course, most severe in four-color printing, in which the web is successively printed with red (magenta), yellow, blue (cyan) and black. High quality color printing requires the closest possible registration between the four successive impressions on the web. Registration is accomplished by fine longitudinal (button-to-gear), circumferential (back and ahead), and cocking (angular about the cylinder axis) adjustment of each of the cylinders. The black is adjusted first, and the three colors are then adjusted to the black. The fineness of the adjustments can be judged by the fact that the maximum endwise or circumferential adjustment of a cylinder to achieve registry does not exceed about 0.03" (0.76 mm); and by the further fact that one complete revolution of a manual adjusting screw for cocking adjustment of the cylinder shifts the cylinder about its pivot point by only 0.0007" (0.0177 mm).

Training pressmen for operating color presses is a very complex job, and that part of it relating to register of the presses presents great difficulties because the only way of gaining practical experience in registration has been on a running press operating at its minimum speed of 500 fpm (152.4 mpm). It is quite apparent that on-press training of apprentices is a very wasteful procedure, because until acceptable registration is achieved, the entire web must be discarded.

The problem of achieving satisfactory registration of successive impressions is, of course, most severe in four-color printing; but it is also present to a lesser extent in three-color and even two-color printing.

Insofar as applicant is aware, there has never heretofore been any device upon which an apprentice could simulate the registering of the successive impressions formed by a multi-color press on a web.

SUMMARY OF THE INVENTION

The present invention provides a training aid of the simulator type for use in teaching the techniques of adjusting the cylinders of a multi-color rotary web printing press to achieve acceptable registration between the successive impressions forming a printed color page.

The training aid utilizes a control box which is precisely like that on a commercial four-color press; and the training aid operates through electric motors to produce movements of flat, color positive transparencies which precisely simulate the movements of a press cylinder which result from using the controls on a printing press. In addition, a cocking adjustment which is precisely like that on a printing press is arranged to produce a cocking adjustment of each of the transparencies which precisely simulates the actual adjustment on a press.

The training aid is used by having the instructor set up a typical out-of-register condition of the red, yellow and blue transparencies and then having the apprentice trainee manipulate the controls until he has achieved what he believes is satisfactory registration. The apparatus is then checked by the instructor who may require that the trainee resume the registration attempt until the instructor is satisfied with the results.

In order to place some time pressure upon the trainee, a "timer" is mounted upon the training aid alongside the control box, and is manually started by the trainee when he begins a registration training run and is manually stopped when he believes he has achieved satisfactory registration. The "timer" is in the form of a roll of adding machine tape which is unreeled by an electric motor at one-thirtieth the speed of a press operating at 500 fpm (152.4 mpm), so that the tape reels off at 16.66 fpm (5.07 mpm); with the tape marked in 30-second intervals which also shows the number of signatures that would have been spoiled if an on-press adjustment had taken the amount of time required on the simulator.

THE DRAWINGS

FIG. 1 is a perspective view of a training aid embodying the invention;

FIG. 2 is a plan view on an enlarged scale of the control box and the timer with parts broken away to show the timer structure;

FIG. 3 is a fragmentary sectional view on an enlarged scale taken substantially as indicated along the line 3—3 of FIG. 1;

FIG. 4 is a fragmentary sectional view taken substantially as indicated along the line 4—4 of FIG. 3 with parts broken away;

FIG. 5 is an exploded perspective view of the parts for supporting and adjusting the yellow film;

DETAILED DESCRIPTION OF THE INVENTION

Figure 6:
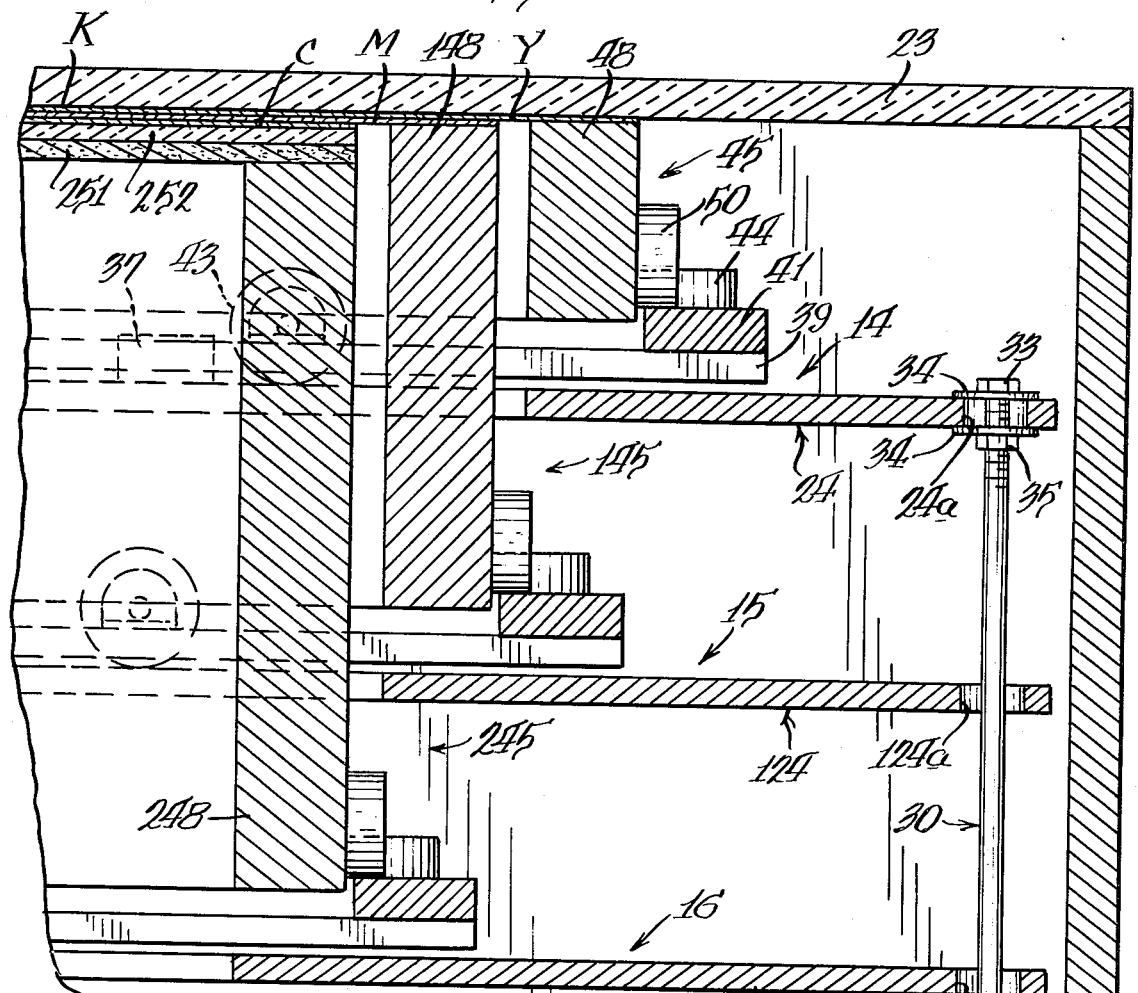
FIG. 6 is a fragmentary sectional view on an enlarged scale taken substantially as indicated along the line 6—6 of FIG. 4.

Referring to the drawings in greater detail, and referring first to FIGS. 1–4, the training aid of the invention comprises a housing, indicated generally at 10, which is supported upon legs 11 at an angle of about 45° to the horizontal. Mounted on one end of the housing 10 are a control box, indicated generally at 12, and a timer, indicated generally at 13. Inside the housing 10 are film supporting and adjusting assemblies, indicated generally at 14, 15 and 16, which support, respectively, a yellow transparency Y, a red (magenta) transparency M, and a blue (cyan) transparency C. Associated with the three supporting and adjusting assemblies 14, 15 and 16 are three identical cocking control mechanisms, indicated generally at 17.

The housing 10 is, essentially, a rectangular box having a bottom wall 18, a front wall 19, a rear wall 20, a right-hand end wall 21 upon which the control box 12 and timer 13 are mounted, and a left end wall 22. The top of the housing 10 is closed by a removable rigid transparent plastic sheet 23 on the underside of which is a black image K. Each image K, Y, M and C may either be on a transparency bonded to a plastic sheet or formed directly upon a plastic sheet which, for Y, M and C, are limp sheets of a material such as Mylar.

The black image K and the transparencies Y, M and C are provided, respectively, with color patterns corresponding precisely to those which would be laid down by the black, yellow, magenta and cyan impressions of a four-color rotary press. Thus, each transparency has either a rotogravure pattern or a halftone pattern. If perfect registration is achieved, the patterns of the black image and of the three transparencies are precisely positioned relative to one another. However, the very small size of the colored dots laid down either in halftone or in rotogravure printing makes it very difficult to achieve perfect registration between the four images.

Referring now particularly to FIGS. 3–6, the three transparency mounting and adjusting assemblies 14, 15 and 16 have components which are alike in their function, although some of them differ in size; so the components of the assembly 14 will first be described by reference to FIG. 5.

A rectangular tray 24 consists of a front plate 25, a rear plate 26, a right end plate 27 and a left end plate 28 which cooperate to define a rectangular opening 29. As seen in FIGS. 3, 4 and 6, the tray 24 is supported upon four jackscrews 30 which are seated upon the floor 18 of the housing 10 and extend upwardly through clearance openings in respective trays 124 and 224 of the assemblies 15 and 16. One jackscrew 30 is illustrated in detail in FIG. 6, and is seen to consist of a long threaded bolt 31 which screws into a threaded bore in a plate 32 fixed to the floor 18 of the housing. The bolt 31 extends through a clearance hole 24a in the tray 24 and has a head 33 resting upon a washer 34. A washer 34 and nut 35 permit the tray 24 to be firmly clamped while allowing limited motion with respect to the jackscrew 30 as is needed for movement of the tray by the cocking adjusting mechanism 17. A tang 31a on the lower end of the bolt 31 permits easy vertical adjustment of the tray 24, while a bottom lock nut 36 and washer 36a securely fix the bolt 31 when the tray is at a desired adjusted level. The clearance holes 124a and 224a permit the cocking adjustment of the respective trays 124 and 224.

On the end plates 27 and 28 of the tray 24 are upright roller bearings 37; and a subframe, indicated generally at 38, is supported upon the tray 24 between the roller bearings 37. The subframe 38 consists of a right end member 39 and a left end member 40 which are joined by a front rail 41 and a rear rail 42. Rollers 43 are rotatably mounted upon angle brackets 43a and extend below the end plates 39 and 40 so as to support the subframe 38 upon the tray 24 for free rolling movement between the roller bearings 37. On the front rail 41 and the rear rail 42 of the subframe 38 are upstanding roller bearings 44.

A transparency supporting frame, indicated generally at 45, consists of a right end member 46, a left end member 47, a front member 48, and a rear member 49. Supporting rollers 50 are rotatably mounted upon the front member 48 and the rear member 49 and rest upon the subframe rails 41 and 42 to mount the frame 45 for free rolling movement between the roller bearings 44 on the subframe.

The components of the assemblies 15 and 16 which correspond to the just described components of the assembly 14 will not be described in detail except to identify the differences between them, but corresponding components are identified in the drawings by corresponding numbers which, like the trays 124 and 224, are the same as the component numbers for the assembly 14, but either 100 or 200 numbers higher. As clearly seen in FIGS. 3, 4 and 6, the trays 24, 124 and 224 are all the same size; but the subframes 138 and 238 are progressively shorter and narrower than the frame 38; and the frames 145 and 245 fit concentrically within the frame 45. As seen in FIGS. 3 and 6, the members forming the frames 145 and 245 are progressively deeper than the corresponding members of the frame 45, so that although the trays 24, 124 and 224 are one below the other, the upper ends of the frames 45, 145 and 245 occupy closely adjacent planes immediately beneath the transparent cover plate 23 of the housing 10, so that the transparencies Y, M and C may all be in light surface contact with one another, and the transparency Y in light surface contact with the black image B1. The frame 248 is surmounted by translucent plate means which is seen in the drawings to consist of a lower translucent plate 251 and an upper transparent plate 252; but of course a single translucent diffuser plate may be substituted for the two plates. The plate means supports all the transparencies.

The tray 124 and the tray 224 are supported, respectively upon jackscrews 130 and 230 which are the same as the jackscrews 30 except for their height; and the jackscrew mounting of the three trays permits the plane of the trays to be individually adjusted to bring the transparencies into contact with one another and with the top plate 23 so that there is effectively no parallax between the black, yellow, red and blue images.

Referring now particularly to FIGS. 4 and 5, adjustment of the subframes 38, 138 and 238 upon the respective trays 24, 124 and 224 is accomplished by three electric motors such as the motor 53 which is mounted upon the front member 25 of the tray 24 and has a threaded output shaft 54 which engages a threaded bore in a drive block 55 on the subframe front rail 41. A motor like the motor 53 is mounted upon each of the trays 124 and 224 and engages a drive block on each of the subframes which is identical to the drive block 55. When the motor 53 is driven in one direction it moves the subframe 38 rearwardly, while opposite rotation of the motor 53 moves the subframe forwardly.

Lateral movement of the frames 45, 145 and 245 upon the subframes is accomplished by electric motors such as the motor 56 which is seen on the left end member of the subframe 38. The motor 56 has a threaded output shaft 57 which engages a threaded bore in a drive block 58 on the left end member 47 of the frame 45. Identical drive motors and drive blocks on the subframes 138 and 238 provide for lateral movement of the respective frames 145 and 245. The motor 56 rotates in one direction to move the frame 45 to the right, and in the opposite direction to move the frame 45 to the left.

The small clearances between the frames and the subframes make it necessary to provide safety limit switches to restrict fore-and-aft movement of each of the subframes on its supporting tray, and lateral movement of each of the frames on its supporting subframe. The means for accomplishing the limitation of movement is best seen in FIGS. 4 and 5. A rearward normally closed limit switch 59 and a forward normally closed limit switch 60 are mounted upon the front member 25 of the tray 24 and have switch actuating arms 59a and 60a in parallel planes. A bolt 61 extends forwardly from the front rail 41 of the subframe 38 and has an actuator bar 62 which is in a plane between the planes of the switch actuating arms 59a and 60a. Accordingly, excessive rearward motion of the subframe 38 will cause the actuator bar 62 to strike the switch arm 59a to open the switch and thus break the circuit to the motor 53. Similarly, excessive forward movement of the subframe 38 causes the actuator bar 62 to strike the switch arm 60a to open the limit switch 60 and thus open the circuit to the motor 53. An identical arrangement of limit switches and actuator arm is mounted upon each of the trays 124 and 224, and upon the front rail of each of the subframes 138 and 238.

Similarly, a left-hand limit switch 63 and a right-hand limit switch 64 are mounted upon the right end member 39 of the subframe 38 and have respective switch actuating arms 63a and 64a in parallel planes. A bolt 65 mounted in the right frame member 46 of the frame 45 has an actuator bar 66 which occupies a plane between those of the switch actuator arms 63a and 64a, so that excessive movement of the frame 45 in either direction upon the subframe 38 will cause one or the other of the limit switches 64 and 65 to break the energizing circuit for the drive motor 56. Each of the subframes 138 and 238 and each of the frames 145 and 245 is equipped with motion limiting means identical with that just described.

Each of the adjusting motors 53 and 56, and the corresponding adjusting motors for the frames 145 and 245 is controlled by a switch on the control panel 12. The switches are identical with those on a rotary color press, and they are identically arranged. A switch 67 controls operation of the motor 53 and is spring-loaded to a normal open position as illustrated in FIG. 2. Clockwise rotation of the switch 67 (toward the letter B) energizes the motor 53 to move the subframe 38 in a direction to simulate that produced by "back" rotation of a press cylinder; while counterclockwise rotation of the switch 67 (toward the letter A) moves the yellow transparency in a direction to simulate the motion of a cylinder which is adjusted "ahead" or "advance."

The motor 56 is controlled by a switch 68 which is rotated clockwise (toward the letter B) to produce leftward motion of the frame 45; while counterclockwise rotation of the switch 68 (toward the letter G) causes the frame 45 to be shifted to the right. The letters G and B are used because endwise movement of the cylinder in one direction is toward the drive gears, while endwise movement in the opposite direction is toward the control buttons. The control panel 12 differs from that on a press only in lacking switches and lights for a black cylinder.

Switches 167 and 168 control the motors for the subframe 138 and the frame 145, respectively, while switches 267 and 268 control the motors for the subframe 238 and the frame 245, respectively. Pilot lights 69, 169 and 269 indicate when a frame or a subframe has been moved far enough to actuate a limit switch, as on a press.

Turning now to the cocking mechanism 17, of which there is one for each of the trays, at the right of FIG. 3 is seen a pivot post 70, the lower end of which is fastened to the housing floor 18 and the upper end of which is carried in a bracket 71 on the right-hand housing wall 21. The pivot post 70 makes a close sliding fit in pivot hole 72 (FIG. 5) in each of the trays 24, 124 and 224. Thus, operation of each of the three cocking mechanisms 17 pivots a tray in its own plane about the pivot post 70, and thus similarly cocks the transparency supported on that tray in its own plane.

The cocking mechanisms 17 are best seen in FIG. 5 to consist of a threaded adjusting screw 73 which extends through a hole in the front wall 19 of the housing 10 and has a square tang 73a at its outer end to receive a wrench. Collars 74 and 75 are fixed to the adjusting screw 73 and bear upon opposite faces of the housing front wall 19 to fix the adjusting screw against endwise movement in the wall. A second-class lever 76 has a fulcrum 77 upon an angle bracket 78 that is secured to the inner face of the left-hand wall 22 of the housing 10, and a threaded nut 79 on the free end of the lever 76 receives the adjusting screw 73 so that rotation of the screw 73 turns the lever 76 about its fulcrum 77. A stud 80 on the upper surface of the lever 76, close to the fulcrum 77, seats in a bore 81 (FIG. 5) near the left front corner of the tray 24, so that a relatively large movement of the nut 79 upon the adjusting screw 73 produces a relatively very small movement of the tray 24 about the pivot post 70. As seen in FIG. 1, three cocking adjustment screws 73 project from the front wall 19 of the housing, one below the other, near the left-hand end of the housing.

The cocking adjustment of the present apparatus is so proportioned with reference to the size of the trays 24, 124 and 224, that one revolution of an adjusting screw 73 will produce a cocking movement of the transparency supported on the tray which exactly simulates the cocking movement of the image printed by a cylinder when a cocking screw on the press is turned one revolution.

Similarly, the screw and nut drives of the motors 53 and 56, and of their counterparts for the assemblies 15 and 16, precisely simulate the rate of adjustment of a cylinder in the ahead, back, gear and button adjustments—i.e., when a switch such as the switch 67 is held in closed position for a certain period of time, the resulting motion of the transparency is exactly the same as if the same control switch on a printing press had been closed for the same length of time.

The housing 10 must function as a light box, and for this purpose any desired number of sets of fluorescent lamps 82 are mounted on the bottom 18 of the housing.

Figure 7:
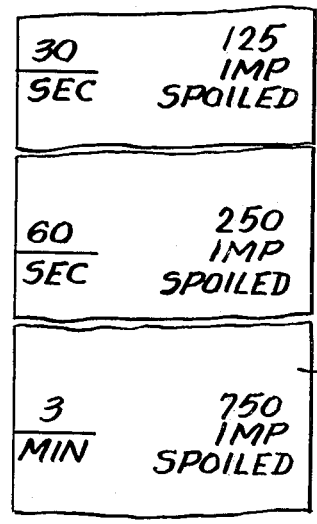
FIG. 7 is a fragmentary plan view of a portion of the tape used in the timer.

Turning now to FIGS. 2 and 7, the timer 13 has a spindle 83 which supports a spool of tape 84. An electric motor 85 has a drum 86 on its drive shaft, and the tape 84 traverses the drum against which it is held by a spring-loaded roller 87 which is carried in a pivoted yoke 88. Operation of the motor 85 is controlled by a toggle switch 89.

The tape 84 is marked as seen in FIG. 7 to show intervals of 30 seconds and also to show the number of spoiled signatures which would have been produced by a press running at 500 feet per minute for that number of seconds. The speed of the motor 85 reels the tape 84 from the spool at about 16.66 fpm (5.07 mpm), which is about one-thirtieth of 500 feet per minute. Accordingly, the 30-second time interval markings on the tape 84 are 8.33 feet (2.53 m) apart.

It has been found while using a prototype of the training aid of the invention to train apprentices that the timer, which causes the trainee to see paper wasted as he works with the registering adjustments, greatly enhances the effectiveness of the training aid by instilling a sense of urgency in the apprentice trainee which cannot be produced as effectively in other ways.

The foregoing detailed description has been given for clearness of understanding only and no unnecessary limitations should be understood therefrom as modifications will be obvious to those skilled in the art.

I claim:

1. A training aid of the simulator type for teaching the registering of successive impressions in multi-color printing with a web press, said training aid comprising, in combination:

a base;

a plurality of generally concentric film supporting frames operatively associated with said base, an inner one of said frames being mounted for transverse, fore-and-aft and pivotal adjustments relative to the base;

a transparent film on each of said frames, each of said films bearing a precise positive facsimile of the printed pattern produced on a paper web by one of the cylinders of a multi-cylinder color printing press during the production of a multi-color printed web, said films occupying planes in a face abutting relationship which is effectively devoid of parallax;

a light source in said base below said films;

a first electric motor for moving said one frame transversely on the base to simulate the button-to-gear adjustment of a printing press cylinder;

a second electric motor for moving said one frame fore-and-aft on the base to simulate the circumferential adjustment of a printing press cylinder;

a control panel which effectively duplicates that on a multi-color printing press;

a plurality of control switches on said panel which are identical with those on a printing press control panel, each of said switches being in an energizing circuit for one of said motors to operate said one of said motors selectively in a forward or a reverse mode;

and a manual cocking control to simulate the cocking adjustment of a printing press cylinder, said cocking control being operatively connected to pivot said one frame about a pivot at one side of the frame and thereby move the film in the plane that it occupies.

2. The training aid of claim 1 which includes means for leveling said adjustable frame to provide full face abutting contact of the film thereon with the next adjacent film.

3. The training aid of claim 2 which includes a tray on which the adjustable frame is carried, and the means for leveling said frame comprises rotatable threaded posts which adjustably support the tray on the base.

4. The training aid of claim 3 in which the cocking control is operatively connected to the tray to pivot it.

5. The training aid of claim 1 which includes a tray, means supporting the tray on the base, a subframe movably supported on the tray and supporting the adjustable frame, in which one of the electric motors is secured to the tray and is directly operatively connected to the subframe to move the subframe on the tray, and in which the other of the electric motors is secured to the subframe and is directly operatively connected to the frame to move the frame on the subframe, said subframe and said frame being mounted for movement in their respective planes at right angles to one another.

6. The training aid of claim 5 in which the means supporting the tray comprise threaded posts that adjustably support the tray on the base to level the adjustable frame and thereby provide for full face abutting contact of the film thereon with the next adjacent film.

7. The training aid of claim 6 in which the cocking control includes a screw which produces movement of the adjustable frame which is precisely proportional to the movement of a printing press cylinder produced by rotation of a standard cylinder cocking screw, so that one revolution of the training aid cocking control screw produces movement of the transparency on the adjustable frame that is effectively identical to the movement of a plate on the cylinder when the cylinder cocking screw is turned one revolution.

8. The training aid of claim 7 in which each of the motors has an operative connection to the adjustable frame which produces a motion of the frame in response to a given period of energization of the motor which is substantially identical to the motion of a printing cylinder in response to an equal period of energization of a standard cylinder adjusting drive.

9. The training aid of claim 1 in which the cocking control includes a screw which produces movement of the adjustable frame which is precisely proportional to the movement of a printing press cylinder produced by rotation of a standard cylinder cocking screw, so that one revolution of the training aid cocking control screw produces movement of the transparency on the adjustable frame that is effectively identical to the movement of a plate on the cylinder when the cylinder cocking screw is turned one revolution.

10. The training aid of claim 9 in which each of the motors has an operative connection to the adjustable frame which produces a motion of the frame in response to a given period of energization of the motor which is substantially identical to the motion of a printing cylinder in response to an equal period of energization of a standard cylinder adjusting drive.

11. The training aid of claim 1 which includes three concentric adjustable frames, a yellow facsimile image on a film on a first of said adjustable frames, a blue facsimile image on a film on a second of said adjustable frames, and a red facsimile image on the third of said adjustable frames, there being a black facsimile image on a fourth frame which is fixed on the base, a first separate electric motor for moving each adjustable frame transversely, a second separate electric motor for moving each adjustable frame fore-and-aft, a switch on the control panel for each separate electric motor, and a separate manual cocking control operatively connected to each adjustable frame.

12. The training aid of claim 11 which includes means for leveling each of said adjustable frames to provide full face abutting contact of all the films with one another.

13. The training aid of claim 12 which includes three vertically spaced trays on each of which one of the adjustable frames is carried, and the means for leveling each of said frames comprises rotatable threaded posts which adjustably support each tray on the base.

14. The training aid of claim 13 in which the base includes a bottom wall, and all of said posts are rotatably mounted on said bottom wall with the posts for each upper tray extending through clearance holes in each tray beneath it.

15. The training aid of claim 11 which includes three vertically spaced trays, a subframe movably supported on each tray and supporting one of the adjustable frames, in which one of the separate electric motors is secured to each tray and is directly operatively connected to the subframe on said tray to move the subframe on the tray, and in which a second of the separate electric motors is secured to said subframe and is directly operatively connected to move the frame on said subframe, said subframe and said frame being mounted for movement in their respective planes at right angles to one another.

16. The training aid of claim 15 in which each cocking control pivots one of the trays.

17. The training aid of claim 16 in which each cocking control includes a screw which produces movement of the adjustable frame which is precisely proportional to the movement of a printing press cylinder produced by rotation of a standard cylinder cocking screw, so that one revolution of the training aid cocking control screw produces movement of the transparency on the adjustable frame that is effectively identical to the movement of a plate on the cylinder when the cylinder cocking screw is turned one revolution.

18. The training aid of claim 17 in which each of the separate motors has an operative connection to the adjustable frame which produces a motion of the frame in response to a given period of energization of the motor which is substantially identical to the motion of a printing cylinder in response to an equal period of energization of a standard cylinder adjusting drive.

19. The training aid of claim 11 in which each cocking control includes a screw which produces movement of the adjustable frame which is precisely proportional to the movement of a printing press cylinder produced by rotation of a standard cylinder cocking screw, so that one revolution of the training aid cocking control screw produces movement of the transparency on the adjustable frame that is effectively identical to the movement of a plate on the cylinder when the cylinder cocking screw is turned one revolution.

20. The training aid of claim 19 in which each of the separate motors has an operative connection to the adjustable frame which produces a motion of the frame in response to a given period of energization of the motor which is substantially identical to the motion of a printing cylinder in response to an equal period of energization of a standard cylinder adjusting drive.

21. The training aid of claim 11 which includes first limit switch means for restricting the transverse movement of each adjustable frame and second limit switch means for restricting the fore-and-aft movement of each adjustable frame.

22. The training aid of claim 11 which includes timer means which may be manually started at the beginning of a registering training run and manually stopped when a trainee believes he has achieved satisfactory register of the facsimile transparencies, said timer means being calibrated to show both elapsed time and the number of imperfect printed impressions produced in that elapsed time by a rotary press operating at 500 feet per minute.

23. The training aid of claim 22 in which the timer comprises a reel carrying a roll of paper tape and an electric motor to drive the reel for unwinding the tape, said tape being marked at intervals to show both elapsed time and imperfect impression production, and said reel being driven at a predetermined fraction of 500 feet per minute.

24. The training aid of claim 11 which includes a rigid, light transmitting plate on the innermost of the three concentric adjustable frames, said plate supporting the films.

25. The training aid of claim 1 which includes timer means which may be manually started at the beginning of a registration run and manually stopped when a trainee believes he has achieved satisfactory register of the facsimile transparencies, said timer means being calibrated to show both elapsed time and the number of imperfect printed impressions produced in that elapsed time by a rotary press operating at 500 feet per minute.

26. The training aid of claim 25 in which the timer comprises a reel carrying a roll of paper tape and an electric motor to drive the reel for unwinding the tape, said tape being marked at intervals to show both elapsed time and imperfect impression production, and said reel being driven at a predetermined fraction of 500 feet per minute.

27. The training aid of claim 1 which includes first limit switch means for restricting the transverse movement of the adjustable frame and second limit switch means for restricting the fore-and-aft movement of said adjustable frame.

28. The training aid of claim 1 which includes a rigid, light transmitting plate on the inner one of the frames which supports the films.

* * * * *